US012726400B2

(12) United States Patent
Gu et al.

(10) Patent No.: US 12,726,400 B2
(45) Date of Patent: Sep. 1, 2026

(54) USE OF BACKUP HEARTBEAT SIGNAL TO MITIGATE SPLIT-BRAIN CONDITIONS

(71) Applicant: Fortinet, Inc., Sunnyvale, CA (US)

(72) Inventors: Jinshan Gu, Burnaby (CA); Yong Wang, Burnaby (CA); Frank Pan, Burnaby (CA)

(73) Assignee: FORTINET, INC., Sunnyvale, CA (US)

( * ) Notice: Subject to any disclaimer, the term of this patent is extended or adjusted under 35 U.S.C. 154(b) by 70 days.

(21) Appl. No.: 18/820,526

(22) Filed: Aug. 30, 2024

(65) Prior Publication Data

US 2026/0067154 A1 Mar. 5, 2026

(51) Int. Cl.
*H04L 41/0663* (2022.01)
*H04L 43/10* (2022.01)

(52) U.S. Cl.
CPC .......... *H04L 41/0663* (2013.01); *H04L 43/10* (2013.01)

(58) Field of Classification Search
CPC ........................... H04L 41/0663; H04L 43/10
USPC ........................................................ 709/224
See application file for complete search history.

(56) References Cited

U.S. PATENT DOCUMENTS 8,291,258 B2 * 10/2012 Narayanaswamy ........................ H04L 63/1408 714/4.11
8,462,952 B2 * 6/2013 Hoover .................. H04L 41/28 709/224
8,526,300 B2 * 9/2013 Arberg ................ H04L 41/0654 370/225
8,676,959 B2 * 3/2014 Morich .................. H04L 69/40 714/4.11
10,425,304 B2 * 9/2019 Balwani .............. H04L 43/0811
10,693,813 B1 * 6/2020 Da Silva et al. ... H04L 12/4641
10,805,192 B2 * 10/2020 Boutros ................. H04L 41/40
11,477,288 B1 * 10/2022 Singh ...................... H04L 67/12
11,494,179 B1 * 11/2022 Paramasivan ........... G06F 8/656

(Continued)

FOREIGN PATENT DOCUMENTS

EP 4329263 A1 * 2/2024 .......... H04L 65/1104
EP 4611329 A1 * 9/2025 ......... H04L 12/1863

*Primary Examiner* — Anthony Mejia
(74) *Attorney, Agent, or Firm* — Jaffery Watson Hamilton & DeSanctis LLP

(57) ABSTRACT

Approaches to using a backup heartbeat interface to detect and mitigate high availability (HA) split-brain conditions are described. Heartbeat packets from the primary appliance received via a regular heartbeat interface of the backup appliance and monitored the backup appliance to determine whether the connection with the primary appliance via the regular heartbeat interface is stable. A backup heartbeat interface on the backup appliance is enabled in response to a determination that the primary appliance is not operating properly resulting from analyzing at least a status of the heartbeat packets from the primary appliance. A backup heartbeat packet is transmitted from the backup appliance to at least the regular heartbeat interface of the primary appliance in response to a determination that the primary appliance is not operating properly. Services are provided with the backup appliance to replace services previously provided by the primary appliance. Transmission of the backup heartbeat packets from the backup appliance continues while providing services with the backup appliance.

20 Claims, 7 Drawing Sheets

(56) References Cited

U.S. PATENT DOCUMENTS

| | | | | |
|---|---|---|---|---|
| 11,848,995 | B2 * | 12/2023 | Devireddy | H04L 41/0823 |
| 2002/0161922 | A1 * | 10/2002 | Scott | H04M 7/1245 709/239 |
| 2003/0037275 | A1 * | 2/2003 | Bakke | G06F 11/2089 714/4.3 |
| 2007/0180077 | A1 * | 8/2007 | Letca | H04L 43/0817 709/224 |
| 2009/0187654 | A1 * | 7/2009 | Raja | H04L 67/02 709/224 |
| 2013/0051219 | A1 * | 2/2013 | Bajamahal | H04L 41/0654 370/220 |
| 2014/0330977 | A1 * | 11/2014 | van Bemmel | H04L 69/22 709/226 |
| 2017/0230230 | A1 * | 8/2017 | Theogaraj | H04L 45/48 |
| 2017/0237830 | A1 * | 8/2017 | Hartrick | H04L 47/767 709/203 |
| 2017/0366983 | A1 * | 12/2017 | Gunasekara | H04L 43/0811 |
| 2019/0123956 | A1 * | 4/2019 | Satapathy | H04L 49/356 |
| 2019/0245735 | A1 * | 8/2019 | Umezawa | H04L 67/10 |
| 2020/0067761 | A1 * | 2/2020 | Schmitt | G06F 11/2038 |
| 2021/0243615 | A1 * | 8/2021 | Scholler | H04L 41/0803 |
| 2022/0086237 | A1 * | 3/2022 | Devireddy | H04L 41/0663 |
| 2022/0400016 | A1 * | 12/2022 | Tadepalli | H04L 9/3265 |
| 2023/0344702 | A1 * | 10/2023 | Deng | H04L 69/40 |
| 2024/0073260 | A1 * | 2/2024 | Crovador | G06F 11/0757 |
| 2024/0080239 | A1 * | 3/2024 | Abate | H04L 41/0893 |
| 2024/0305520 | A1 * | 9/2024 | Li | H04L 41/0663 |
| 2024/0357384 | A1 * | 10/2024 | Balasubramaniam | H04L 41/0631 |
| 2025/0047552 | A1 * | 2/2025 | Gupta | H04L 12/4633 |
| 2025/0097526 | A1 * | 3/2025 | Barbis | H04N 21/44204 |
| 2025/0301039 | A1 * | 9/2025 | Kipp | H04L 63/0442 |

* cited by examiner

PROCESSOR(S) 604

INSTRUCTIONS TO CAUSE THE PRIMARY APPLIANCE TO TRANSMIT A REGULAR HEARTBEAT SIGNAL 608

INSTRUCTIONS TO CAUSE ANALYSIS TO DETERMINE LOSS OF THE REGULAR HEARTBEAT SIGNAL 610

INSTRUCTIONS TO CAUSE THE BACKUP APPLIANCE TO ENABLE BACKUP HEARTBEAT INTERFACE ON THE SECONDARY APPLIANCE 612

INSTRUCTIONS TO CAUSE THE BACKUP APPLIANCE TO TRANSMIT A HEARTBEAT SIGNAL WITH FLAG SET TO ALL REGULAR HEARTBEAT INTERFACES 614

INSTRUCTIONS TO CAUSE APPLIANCES THAT RECEIVE REGULAR HEARTBEAT SIGNAL WITH FLAG SET FROM BACKUP APPLIANCE TO ENABLE LOCAL BACKUP HEARTBEAT INTERFACE(S) 616

INSTRUCTIONS TO CAUSE THE OTHER APPLIANCES TO SEND HEARTBEAT PACKETS TO ALL BACKUP HEARTBEAT INTERFACES AND TO REGULAR HEARTBEAT INTERFACES 618

NON-TRANSITORY COMPUTER-READABLE STORAGE MEDIUM 606

SYSTEM 602

FIG. 6

PROCESSOR(S) 704

INSTRUCTIONS TO CAUSE THE BACKUP AND SECONDARY APPLIANCES TO TRANSMIT BACKUP HEARTBEAT SIGNALS 708

INSTRUCTIONS TO DETERMINE IF THE REGULAR HEARTBEAT SIGNAL HAS BEEN RECOVERED 710

INSTRUCTIONS TO CAUSE THE BACKUP APPLIANCE TO SEND HEARTBEAT SIGNAL WITH FLAG CLEARED 712

INSTRUCTIONS TO CAUSE ALL APPLIANCES TO DISABLE BACKUP HEARTBEAT INTERFACES 714

INSTRUCTIONS TO CAUSE ALL APPLIANCES IN HA CLUSTER TO RECEIVE HEARTBEAT PACKETS AND MONITOR FLAG 716

NON-TRANSITORY COMPUTER-READABLE STORAGE MEDIUM 706

SYSTEM 702

FIG. 7

USE OF BACKUP HEARTBEAT SIGNAL TO MITIGATE SPLIT-BRAIN CONDITIONS

BACKGROUND

High Availability (HA) architectures are utilized in environments where little downtime can be tolerated and rely on redundant pairs of devices/appliances and/or redundant sets of data. A split-brain condition indicates data or availability inconsistencies originating from the maintenance of two separate data sets with overlap in scope, either because of server (or appliance) failure, or a failure condition based on servers (or appliances) not communicating and synchronizing their data to each other.

An HA split-brain scenario may occur when a heartbeat interface is down or there is extreme latency or congestion in the heartbeat link(s) between HA members, leading to a secondary unit promoting itself to primary. When an HA cluster is in split-brain status, traffic could be dropped intermittently, and sessions cannot be established properly through the cluster. Thus, avoidance of the split-brain condition is desirable.

TERMS AND DEFINITIONS

Brief definitions of terms used throughout this application are given below.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

In some examples, the FORTIGATE family of network security appliances can include sufficient functionality to find other member FORTIGATE appliances and form high availability (HA) clusters, which include two or more FORTIGATE appliances. In an example, the cluster works like a single device that has at least one hot backup device.

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise.

Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

BRIEF DESCRIPTION OF THE DRAWINGS

To easily identify the discussion of any particular element or act, the most significant digit or digits in a reference number refer to the figure number in which that element is first introduced.

FIG. 6 is an example of a system to use a backup heartbeat interface to detect and mitigate high availability (HA) split-brain conditions.

FIG. 7 is an example of a system to use a backup heartbeat interface to detect and mitigate high availability (HA) split-brain conditions.

DETAILED DESCRIPTION

As described in greater detail below, various approaches that focus on mechanisms to automatically detect a split-brain condition and restore High Availability (HA) cluster members to their designated HA roles, so that the network downtime caused by split-brain can be minimized. During normal operation, appliances in the HA clusters transmit regular heartbeat signals/packets via regular heartbeat interfaces. When a regular heartbeat signal is lost (e.g., not detected by one or more secondary appliances) a secondary appliance can transmit a signal/packet to cause other appliances to enable and utilize a backup heartbeat interface.

Backup heartbeat signals/packets can be transmitted via the backup heartbeat interface(s) until the original configuration is recovered (e.g., a primary appliance becomes fully functional again). In an example, flags within the heartbeat packets are utilized to communicate which heartbeat interfaces to use. In other examples, different mechanisms can be utilized to transmit this information and to manage switching between regular heartbeat interfaces and backup heartbeat interfaces. In general, the purpose of backup heartbeat interface is to detect if the connection between HA appliances is stable, and provide a backup way to communicate and avoid split-brain.

Figure 1:
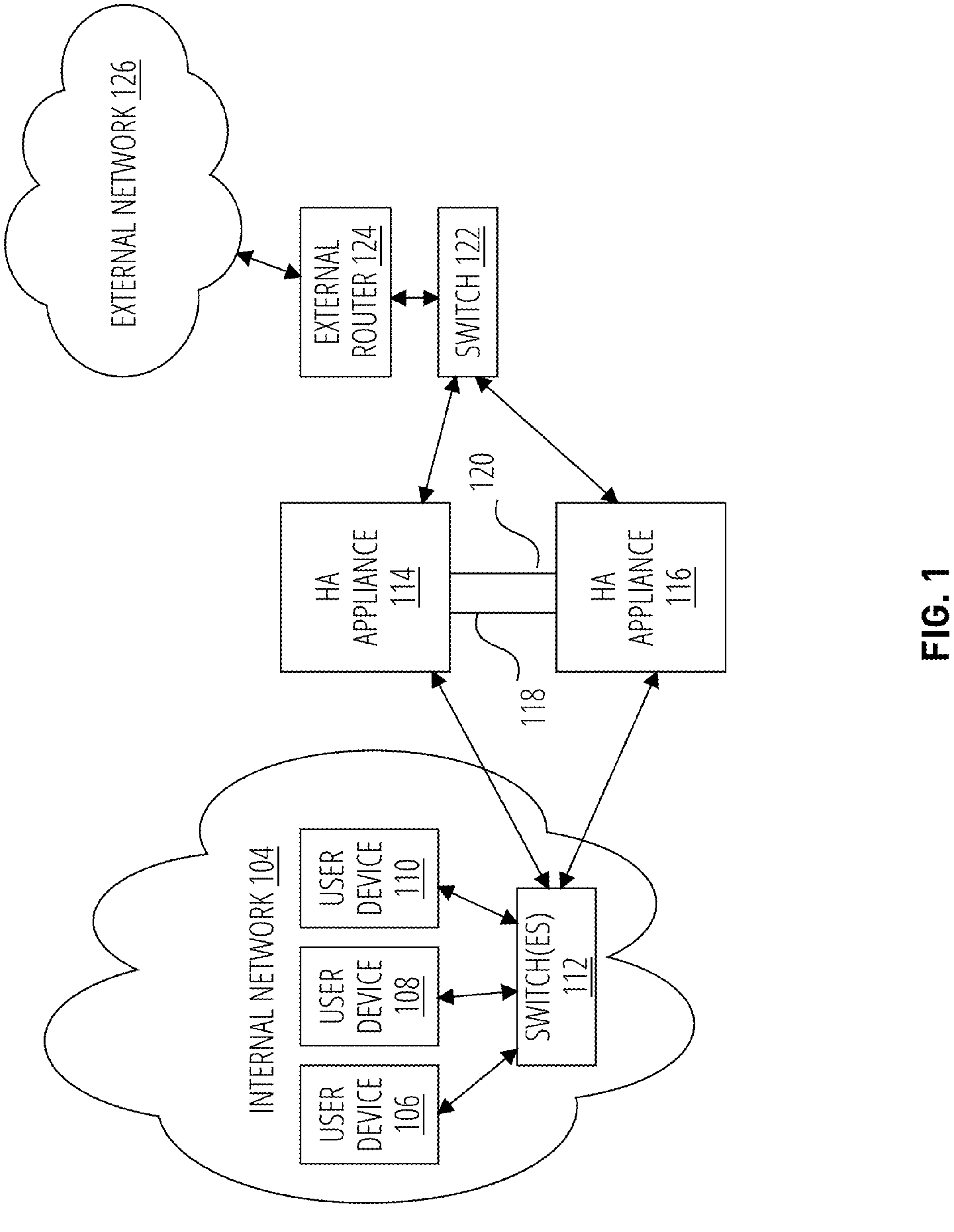
FIG. 1 is a block diagram of an example architecture including a high availability (HA) cluster.

FIG. 1 is a block diagram of an example architecture including a high availability (HA) cluster. The example of FIG. 1 includes a single HA pair; however, in other configurations one or more HA clusters can be included and/or multiple HA pairs can be included.

Internal network 104 includes any number of user devices (e.g., user device 106, user device 108, user device 110) coupled to switch(es) 112. Internal network 104 can be a wired network, wireless network, or combination thereof. User devices can include any type of electronic device that can be coupled to a network via a network protocol including, but not limited to, laptop computers, desktop computers, mobile devices, wearable devices, etc. User devices can also include Internet of Things (IoT) devices including, but not limited to, sensors (e.g., motion, pressure, temperature), thermostats, cameras, speakers, microphones, display devices, drones, etc. The user devices are coupled to switch(es) 112 to HA appliance 114 and HA appliance 116.

In one example, HA appliance 114 and HA appliance 116 form a gateway HA pair to provide gateway security services in an HA manner. In an non-limiting example, HA appliance 114 and HA appliance 116 are from the FORTIGATE family of network security appliances and can include sufficient functionality to find other member FORTIGATE appliances and form HA clusters, which include two or more FORTIGATE appliances. In an example, the cluster works like a single device that has at least one hot backup device. Thus, in an example, one of HA appliance 114 and HA appliance 116 is a primary gateway and the other is a backup. In other configurations, different types of appliances can be used.

In an example, HA appliance 114 and HA appliance 116 communicate via at least regular heartbeat interface(s) 118 and backup heartbeat signal(s) 120. For example, in a two-member cluster as illustrated in FIG. 1, double back-to-back heartbeat connections can be utilized. These heartbeat connections allow the appliances to determine if other appliances are functional. In an example, besides using the interfaces directly connected between HA members (as illustrated in FIG. 1), other interfaces can be used as long as those interfaces are in the same subnet (i.e., they can send and receive packet from each other).

As described in greater detail below, approaches are provided that utilize backup heartbeat interfaces which are heartbeat interfaces used only when a secondary unit (e.g., HA appliance 116) detects no heartbeats from the primary unit (e.g., HA appliance 114) through the regular heartbeat interfaces. When split-brain is detected due to regular heartbeat issues, backup heartbeat interfaces will be started, and HA cluster members can be restored back to their designated roles upon receiving heartbeat packets from backup heartbeat interfaces. Later when it is detected that regular heartbeat interface issues are resolved to work again, backup heartbeat interfaces will be stopped, and the HA system is transitioned back to normal state before a split-brain condition happens.

This approach fits into the existing protocols and ensures that the HA cluster can still work as expected in the event of disconnection or instability in the regular heartbeat interfaces.

Figure 2:
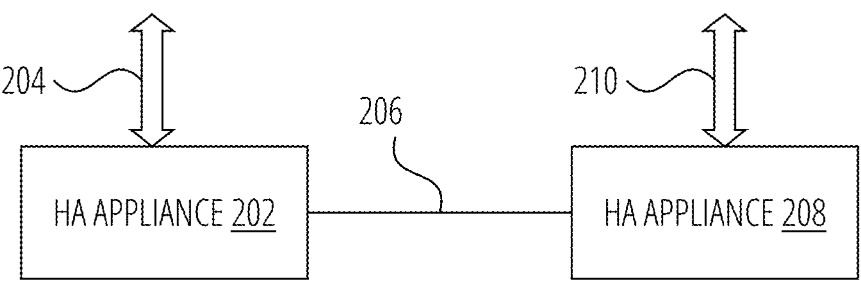
FIG. 2 is a block diagram of an example high availability (HA) pair that can utilize the described approach to using a backup heartbeat interface to detect and mitigate high availability (HA) split-brain conditions.

FIG. 2 is a block diagram of an example high availability (HA) pair that can utilize the described approach to using a backup heartbeat interface to detect and mitigate high availability (HA) split-brain conditions. In an example, HA appliance 202 and HA appliance 208 are HA appliances as described above in FIG. 1 (e.g., provide network gateway services). In other configurations, different types of appliances can be utilized.

In an example, HA appliance 202 and HA appliance 208 are interconnected by at least heartbeat interconnect 206, the functionality of which will be described in greater detail below (e.g., FIG. 4, FIG. 6). HA appliance 202 includes additional hardware and software functionality to support at least network traffic interface(s) 204 for network traffic flow (e.g., as described in FIG. 1). Additional interfaces and functionalities can also be supported.

Similarly, HA appliance 208 includes hardware and software functionality to support network traffic interface(s) 210 for network traffic flow (e.g., as described in FIG. 1). In an example, heartbeat interconnect 206 can provide sufficient bandwidth, interfaces and/or connections to support both the regular heartbeat signal and the backup heartbeat signal. Additional interfaces and functionalities can also be supported.

Figure 3:
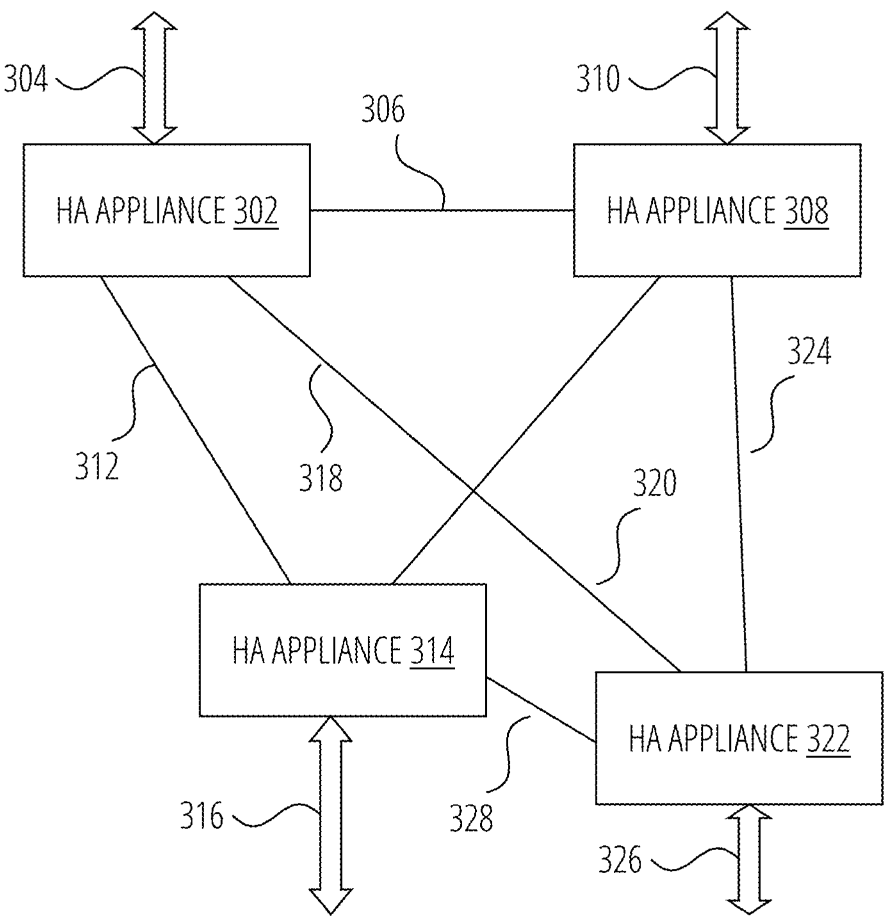
FIG. 3 is a block diagram of an example high availability (HA) cluster that can utilize the described approach to using a backup heartbeat interface to detect and mitigate high availability (HA) split-brain conditions.

FIG. 3 is a block diagram of an example high availability (HA) cluster that can utilize the described approach to using a backup heartbeat interface to detect and mitigate high availability (HA) split-brain conditions. In an example, HA appliance 302, HA appliance 308, HA appliance 314 and HA appliance 322 are HA appliances as described above in FIG. 1 (e.g., provide network gateway services). In other configurations, different types of appliances can be utilized. The example of FIG. 3 illustrates four HA appliances to form an HA cluster; however, any number of appliances can be included in an HA cluster.

In an example each HA appliance (e.g., HA appliance 302, HA appliance 308, HA appliance 314, HA appliance 322) is connected to each other HA appliance in the cluster via at least a heartbeat interconnect (e.g., heartbeat interconnect 306, heartbeat interconnect 312, heartbeat interconnect 318, heartbeat interconnect 320, heartbeat interconnect 324, heartbeat interconnect 328). Each HA appliance includes additional hardware and software functionality to support network traffic flow through various interfaces (e.g., network traffic interface(s) 304 for HA appliance 302, network traffic interface(s) 310 for HA appliance 308, network traffic interface(s) 316 for HA appliance 314, network traffic interface(s) 326 for HA appliance 322). In an example, the various heartbeat interconnects can provide sufficient bandwidth, interfaces and/or connections to support both the regular heartbeat signal and the backup heartbeat signal. Additional interfaces and functionalities can also be supported.

Figure 4:
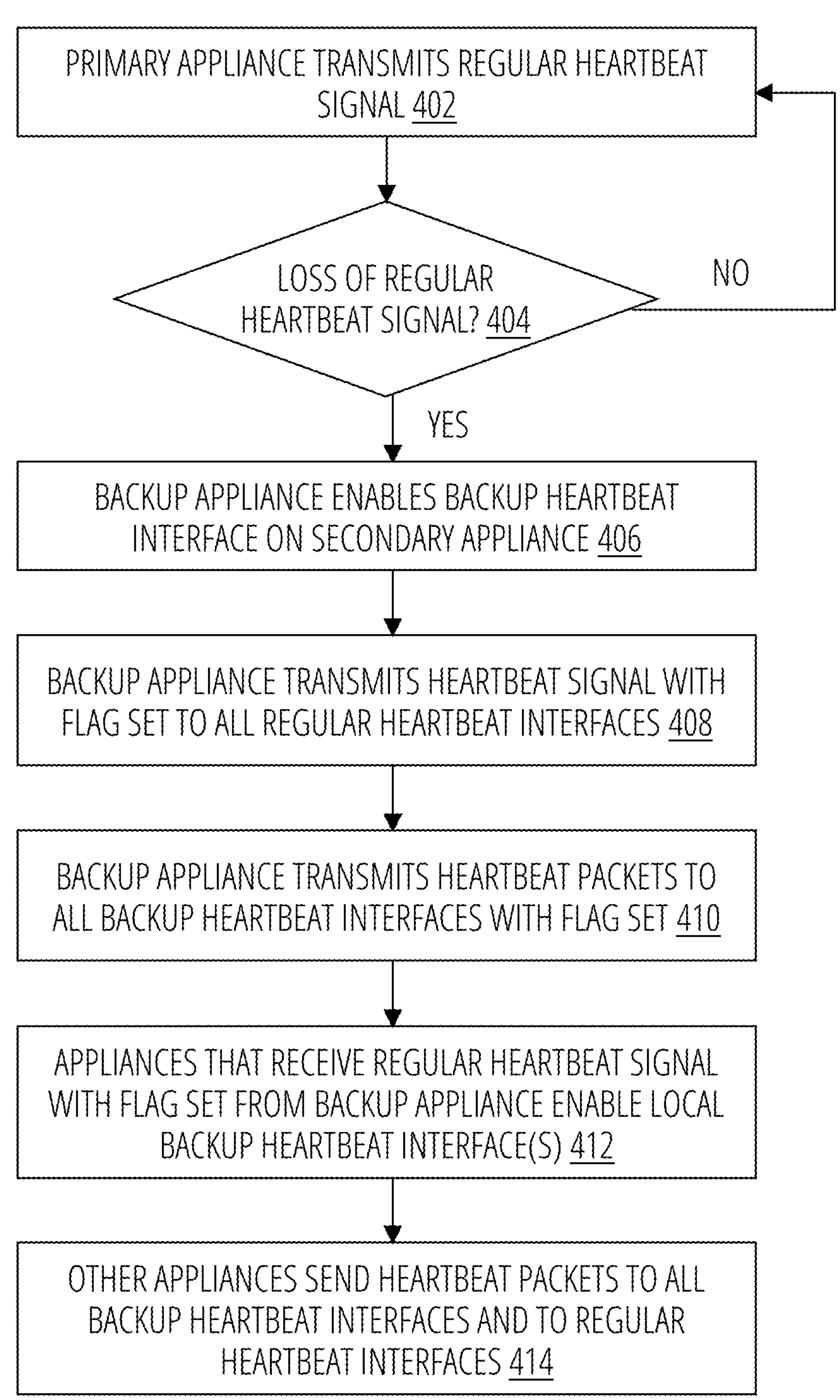
FIG. 4 is a flow diagram of an example approach to using a backup heartbeat interface to detect and mitigate high availability (HA) split-brain conditions.

FIG. 4 is a flow diagram of an example approach to using a backup heartbeat interface to detect and mitigate high availability (HA) split-brain conditions. The functionality described with respect to FIG. 4 can be provided by one or more HA appliances configured to transmit and/or receive heartbeat information from other HA appliances in an HA pair or HA cluster.

The description for FIG. 4 is provided in generic terms for an HA cluster and can be simplified for application to an HA pair. In the following description a primary appliance provides specified services (e.g., network security gateway services) during normal operation. If the primary appliance fails to operate properly a backup appliance can take over and provide the services previously provided by the primary appliance using pre-selected failover mechanisms. The HA cluster can contain additional secondary appliances (in addition to the backup appliance) that can take over providing the appliance services should the backup appliance fail before the primary appliance is restored. Thus, the HA cluster can have multiple backup appliances where one is selected to take over for the primary appliance and to manage the switch over from the regular heartbeat interface (s) to the backup heartbeat interface(s).

In an example, a heartbeat signals is carried by a heartbeat packet that includes information relevant to operation of the various appliances in the HA cluster. In an example, the heartbeat packet includes at least a flag to indicate whether a backup heartbeat interface should be activated and/or used. Additional information can also be transmitted in the heartbeat packet. In an example, the concept of receiving a heartbeat signal (regular, backup, etc.) involves receiving the corresponding heartbeat packet. Fields within the heartbeat packet may be analyzed for various purposes including, for example, use of the backup heartbeat interface. However, for some purposes merely receiving the heartbeat packet may provide sufficient information.

In general, if a regular heartbeat signal is functioning without any issues, the backup heartbeat signal is not utilized. When the regular heartbeat packet is lost, which can cause a split-brain condition, the backup appliance of the HA pair or HA cluster detects the loss of the regular heartbeat signal and initiates use of the backup heartbeat signal interfaces to transmit heartbeat packets. The operation as described in FIG. 4 assumes that one appliance of the HA pair (or HA cluster) has been previously assigned the role as the primary member and is configured to transmit a heartbeat signal according to the relevant protocols.

During normal operation, the primary appliance in the HA pair/cluster transmits a regular heartbeat signal, 402. As mentioned above, this can take the form of a heartbeat packet being transmitted over a specific regular heartbeat interface. If there is no loss of the regular heartbeat signal, 404, the primary appliance continues to transmit the regular heartbeat signal(s), 402.

If there is a loss of the regular heartbeat signal, 404, the secondary appliance enables the backup heartbeat interface on the secondary appliance, 406. The secondary appliance then transmits a heartbeat signal to all regular heartbeat interfaces with the backup heartbeat interface flag set, 408. The secondary appliance then sends a heartbeat signal to all backup heartbeat interfaces, 410. In an example, 408 and 410 can occur concurrently.

When other secondary appliances in the HA cluster receive the heartbeat packets with the backup heartbeat interface flag set, those secondary appliances enable the local backup heartbeat interfaces, 412. The other secondary appliances send heartbeat signals to all backup heartbeat interfaces as well as to all regular heartbeat interfaces, 414. This configuration can continue operating as described until the primary appliance is restored to normal operating parameters and/or other HA cluster modifications are made to compensate for loss of the original primary appliance. The description of FIG. 5 provides one mechanism for disabling the backup heartbeat interface(s) when the regular heartbeat interface(s) recover.

Figure 5:
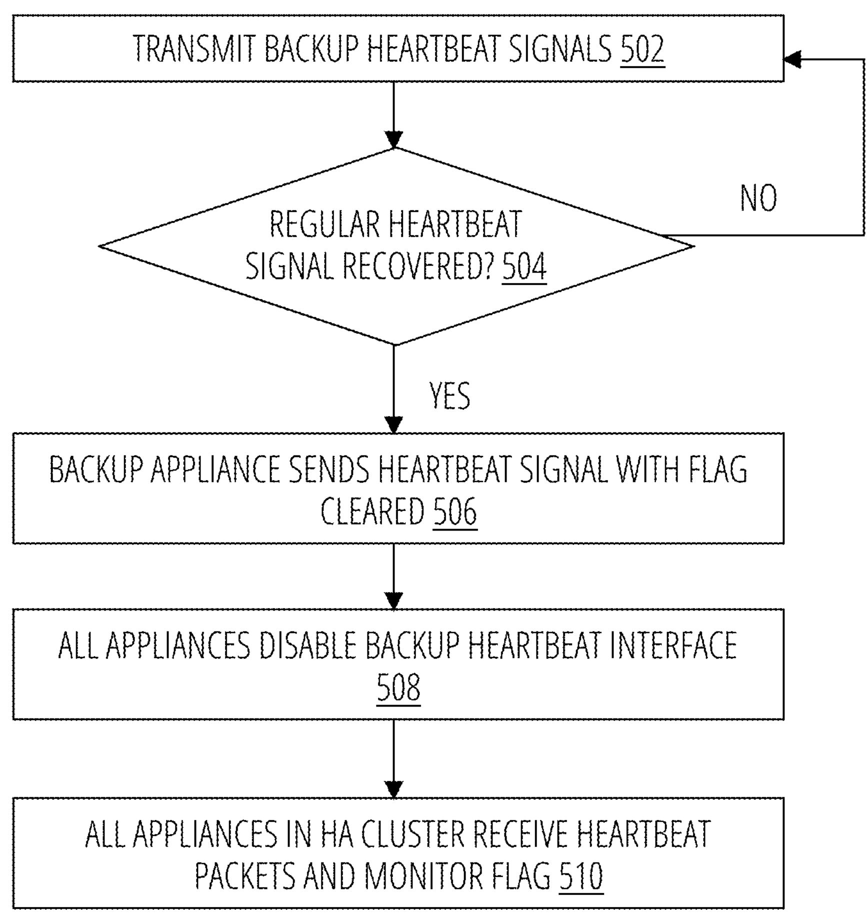
FIG. 5 is a flow diagram of an example approach to recovering from using a backup heartbeat interface to mitigate high availability (HA) split-brain conditions.

FIG. 5 is a flow diagram of an example approach to recovering from using a backup heartbeat interface to mitigate high availability (HA) split-brain conditions. The functionality described with respect to FIG. 5 can be provided by one or more HA appliances configured to transmit and/or receive heartbeat information from other HA appliances in an HA pair or HA cluster.

The backup appliance continues to transmit heartbeat signals as described above, 502. If the regular heartbeat is not recovered, 504, the backup appliance continues to transmit the heartbeat signals, 502. When the regular heartbeat signal has been recovered, 504, the backup appliance sends a heartbeat signal with the flag cleared, 506.

In response to receiving the heartbeat signal with the flag cleared, all appliances in the cluster disable their backup heartbeat interfaces, 508. The appliances of the HA cluster than receive the heartbeat signal via the regular heartbeat interfaces and monitor the backup heartbeat flag for a change in conditions, 510.

FIG. 6 is an example of a system to use a backup heartbeat interface to detect and mitigate high availability (HA) split-brain conditions. In an example, system 602 can include processor(s) 604 and non-transitory computer-readable storage medium 606. Non-transitory computer-readable storage medium 606 may store instructions 608, 610, 612, 614, 616, 618 and 420 that, when executed by processor(s) 604, cause processor(s) 604 to perform various functions. Examples of processor(s) 604 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 606 include tangible media such as random-access memory (RAM), read-only memory (ROM), electrically erasable programmable read-only memory (EEPROM), flash memory, a hard disk drive, etc.

Various types of functionalities are described to accomplish use of a backup heartbeat interface to detect and mitigate HA split-brain conditions. Not every appliance in the HA cluster performs all of the operations described. In an example, each appliance can be configurable to perform all of the operations but may only perform a subset of relevant operations.

Instructions 608 cause processor(s) 604 to cause the primary appliance in an HA cluster to transmit a regular heartbeat signal. As mentioned above, this can take the form of a heartbeat packet being transmitted over a specific regular heartbeat interface.

Instructions 610 cause processor(s) 604 to cause one or more secondary appliances to analyze received signals to determine if the regular heartbeat signal has been lost. If there is no loss of the regular heartbeat signal the primary appliance continues to transmit the regular heartbeat signal (s) and the secondary appliances continue to receive the regular heartbeat signals.

Instructions 612 cause processor(s) 604 to cause the backup appliance that has detected loss of the regular heartbeat signal to enable the local backup heartbeat interface (i.e., enable the backup heartbeat interface of the backup appliance).

Instructions 614 cause processor(s) 604 to cause the backup appliance to transmit a heartbeat signal with a flag set to all regular heartbeat interfaces. In an example, a heartbeat signals are carried by a heartbeat packet that includes information relevant to operation of the various appliances in the HA cluster. In an example, the heartbeat packet includes at least a flag to indicate whether a backup heartbeat interface should be activated and/or used.

Additional information can also be transmitted in the heartbeat packet. In an example, the concept of receiving a heartbeat signal (regular, backup, etc.) involves receiving the corresponding heartbeat packet. Fields within the heartbeat packet may be analyzed for various purposes including, for example, use of the backup heartbeat interface.

Instructions 616 cause processor(s) 604 to cause appliances that receive the regular heartbeat signal with the flag set from the backup appliance to enable local backup heartbeat interfaces.

Instructions 618 cause processor(s) 604 to cause the other appliances to send heartbeat packets to all backup heartbeat interfaces and to regular heartbeat interfaces.

FIG. 7 is an example of a system to use a backup heartbeat interface to detect and mitigate high availability (HA) split-brain conditions. In an example, system 702 can include processor(s) 704 and non-transitory computer-readable storage medium 706. Non-transitory computer-readable storage medium 706 may store instructions 708, 710, 712, 714, 716, 720 and 420 that, when executed by processor(s) 704, cause processor(s) 704 to perform various functions. Examples of processor(s) 704 may include a microcontroller, a microcontroller, a microprocessor, a CPU, a GPU, a DPU, an ASIC, a FPGA, a SoC, etc. Examples of non-transitory computer-readable storage medium 706 include tangible media such as RAM, ROM, EEPROM, flash memory, a hard disk drive, etc.

Instructions 708 cause processor(s) 704 to cause the backup and secondary appliances to transmit backup heartbeat signals with the flag set. Instructions 710 cause processor(s) 704 to determine if the regular heartbeat signal has been recovered.

Instructions 712 cause processor(s) 704 to cause the backup appliance to send the backup heartbeat signal with the flag cleared if the regular heartbeat signal has been recovered. Instructions 714 cause processor(s) 704 to cause the appliances to disable the backup heartbeat interfaces. Instructions 716 cause processor(s) 704 to cause the appliances to receive the regular heartbeat signal and to monitor the backup heartbeat flag.

Figure 8:
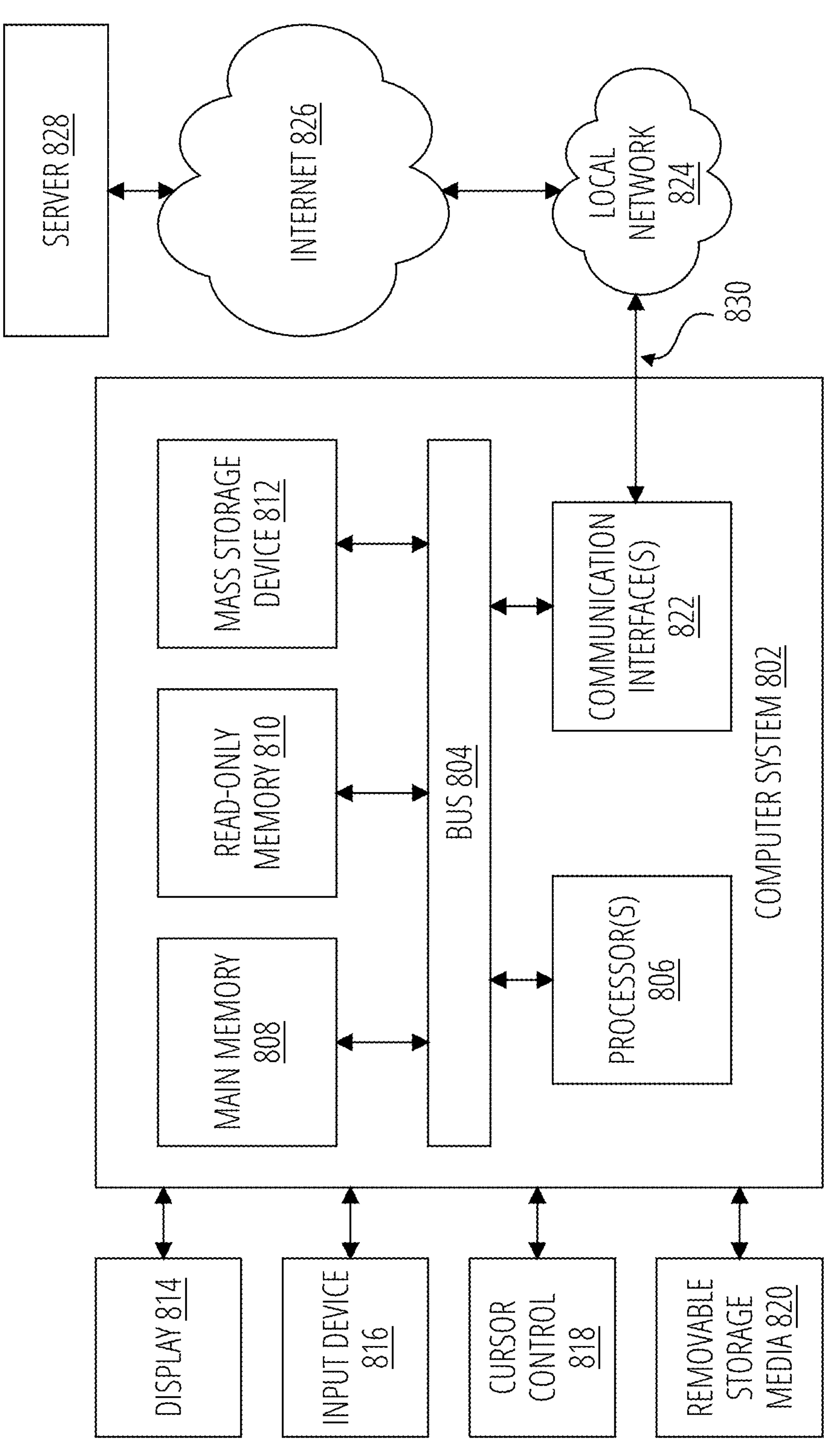
FIG. 8 is a block diagram that illustrates a computer system in which or with which an embodiment of the present disclosure may be implemented.

FIG. 8 is a block diagram that illustrates a computer system in which or with which an embodiment of the present disclosure may be implemented. Computer system 802 may be representative of a computing device capable of providing the functionality described herein (e.g., HA appliance 114, HA appliance 116). Notably, components of computer system 802 described herein are meant only to exemplify various possibilities. In no way should example computer system 802 limit the scope of the present disclosure. In the context of the present example, computer system 802 includes bus 804 or other communication mechanism for communicating information and one or more processing resources (e.g., one or more hardware processor(s) 806) coupled with bus 804 for processing information. Hardware processor(s) 806 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 802 also includes main memory 808, such as a random-access memory (RAM) or other dynamic storage device, coupled to bus 804 for storing information and instructions to be executed by processor(s) 806. Main memory 808 also may be used for storing temporary variables or other intermediate information during execution of instructions to be executed by processor(s) 806. Such instructions, when stored in non-transitory storage media accessible to processor(s) 806, render computer system 802 into a special-purpose machine customized to perform the operations specified in the instructions.

Computer system 802 includes a read-only memory 810 or other static storage device coupled to bus 804 for storing static information and instructions for processor(s) 806. Mass storage device 812 (e.g., a magnetic disk, optical disk or flash disk (made of flash memory chips), is provided and coupled to bus 804 for storing information and instructions.

Computer system 802 may be coupled via bus 804 to display 814 (e.g., a cathode ray tube (CRT), Liquid Crystal Display (LCD), Organic Light-Emitting Diode Display (OLED), Digital Light Processing Display (DLP) or the like, for displaying information to a computer user. Input device 816, including alphanumeric and other keys, is coupled to bus 804 for communicating information and command selections to processor(s) 806. Another type of user input device is cursor control 818, such as a mouse, a trackball, a trackpad, or cursor direction keys for communicating direction information and command selections to processor(s) 806 and for controlling cursor movement on display 814. This input device typically has two degrees of freedom in two axes, a first axis (e.g., x) and a second axis (e.g., y), that allows the device to specify positions in a plane.

Removable storage media 820 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 802 may implement the techniques described herein using customized hard-wired logic, one or more ASICs or FPGAs, firmware or program logic which in combination with the computer system causes or programs computer system 802 to be a special-purpose machine. According to one embodiment, the techniques herein are performed by computer system 802 in response to processor (s) 806 executing one or more sequences of one or more instructions contained in main memory 808. Such instructions may be read into main memory 808 from another storage medium, such as mass storage device 812. Execution of the sequences of instructions contained in main memory 808 causes processor(s) 806 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 812. Volatile media includes dynamic memory, such as main memory 808. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 804. Transmission media can also be acoustic or light waves, such as those generated during radio-wave and infrared data communications.

Various forms of media may be involved in carrying one or more sequences of one or more instructions to processor (s) 806 for execution. For example, the instructions may initially be carried on a magnetic disk or solid-state drive of a remote computer. The remote computer can load the instructions into its dynamic memory and send the instructions over a telephone line using a modem. A modem local to computer system 802 can receive the data on the telephone line and use an infra-red transmitter to convert the data to an infra-red signal. An infra-red detector can receive the data from the infra-red signal, and appropriate circuitry can place the data on bus 804. Bus 804 carries the data to main memory 808, from which processor(s) 806 retrieve and execute the instructions. The instructions received by main memory 808 may optionally be stored on mass storage device 812 either before or after execution by processor(s) 806.

Computer system 802 also includes communication interface(s) 822 coupled to bus 804. Communication interface(s) 822 provides a two-way data communication coupling to network link 830 that is connected to local network 824. For example, communication interface(s) 822 may be an integrated services digital network (ISDN) card, cable modem, satellite modem, or a modem to provide a data communication connection to a corresponding type of telephone line. Another example is communication interface(s) 822, which may be a local area network (LAN) card that provides a data communication connection to a compatible LAN. Wireless links may also be implemented. In any such implementation, communication interface(s) 822 sends and receives electrical, electromagnetic or optical signals that carry digital data streams representing various types of information.

Network link 830 typically provides data communication through one or more networks to other data devices. Local network 824 and internet 826 both use electrical, electromagnetic or optical signals that carry digital data streams. The signals through the various networks and network link 830 and through communication interface(s) 822, which carry the digital data to and from computer system 802, are example forms of transmission media.

Computer system 802 can send messages and receive data, including program code, through the network(s), network link 830 and communication interface(s) 822. In the Internet example, server 828 might transmit a requested code for an application program through internet 826, local network 824 and communication interface(s) 822. The received code may be executed by processor(s) 806 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to “one example” or “an example” means that a particular feature, structure, or characteristic described in connection with the example is included in at least one embodiment of the disclosure. The appearances of the phrase “in one example” in various places in the specification do not necessarily refer to the same embodiment.

It is contemplated that any number and type of components may be added to and/or removed to facilitate various embodiments, including adding, removing, and/or enhancing certain features. For brevity, clarity, and ease of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms “component,” “module,” “system,” and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A method for managing heartbeat signals in a high availability (HA) cluster having at least a primary appliance and a backup appliance, the method comprising:

monitoring heartbeat packets from the primary appliance received via a regular heartbeat interface of the backup appliance with the backup appliance to determine whether the connection with the primary appliance via the regular heartbeat interface is stable;

enabling a backup heartbeat interface on the backup appliance in response to a determination that the primary appliance is not operating properly resulting from analyzing at least a status of the heartbeat packets from the primary appliance;

transmitting a backup heartbeat packet from the backup appliance to at least the regular heartbeat interface of the primary appliance in response to a determination that the primary appliance is not operating properly;

providing services with the backup appliance to replace services previously provided by the primary appliance; and continuing transmission of backup heartbeat packets from the backup appliance while providing services with the backup appliance.

2. The method of claim 1 further comprising:

detecting a return of a regular heartbeat signal from the primary appliance with the backup appliance; and transmitting a backup heartbeat packet with an indication to discontinue use of the backup heartbeat packets.

3. The method of claim 2, wherein transmitting a backup heartbeat packet with an indication to discontinue use of the backup heartbeat packets causes appliances of the HA cluster to disable local backup heartbeat interfaces.

4. The method of claim 2 further comprising providing the services with the primary appliance after use of the backup heartbeat packets has been discontinued.

5. The method of claim 1, wherein the primary appliance and the backup appliance comprise network security gateway devices coupled as an HA pair.

6. The method of claim 1, wherein the primary appliance, the backup appliance and one or secondary appliances comprise network security gateway devices coupled as an HA cluster.

7. The method of claim 1, wherein transmitting a backup heartbeat packet from the backup appliance to regular heartbeat interface of the primary appliance in response to a determination that the primary appliance is not operating properly further comprises also transmitting the backup heartbeat packet to regular heartbeat interfaces of one or more secondary appliances of an HA cluster.

8. A non-transitory computer-readable storage medium having stored thereon instructions that, when executed by one or more processors, cause the one or more processors to:

monitor heartbeat packets from the primary appliance received via a regular heartbeat interface of the backup appliance with the backup appliance to determine whether the connection with the primary appliance via the regular heartbeat interface is stable;

enable a backup heartbeat interface on the backup appliance in response to a determination that the primary appliance is not operating properly resulting from analyzing at least a status of the heartbeat packets from the primary appliance;

transmit a backup heartbeat packet from the backup appliance to at least the regular heartbeat interface of the primary appliance in response to a determination that the primary appliance is not operating properly;

provide services with the backup appliance to replace services previously provided by the primary appliance; and continue transmission of backup heartbeat packets from the backup appliance while providing services with the backup appliance.

9. The non-transitory computer-readable storage medium of claim 8 further comprising instructions that, when executed by the one or more processors, cause the one or more processors to:

detect a return of a regular heartbeat signal from the primary appliance with the backup appliance; and transmit a backup heartbeat packet with an indication to discontinue use of the backup heartbeat packets.

10. The non-transitory computer-readable storage medium of claim 9, wherein transmitting a backup heartbeat packet with an indication to discontinue use of the backup heartbeat packets causes appliances of the HA cluster to disable local backup heartbeat interfaces.

11. The non-transitory computer-readable storage medium of claim 9 further comprising instructions that, when executed by the one or more processors, cause the one or more processors to provide the services with the primary appliance after use of the backup heartbeat packets has been discontinued.

12. The non-transitory computer-readable storage medium of claim 8, wherein the primary appliance and the backup appliance comprise network security gateway devices coupled as an HA pair.

13. The non-transitory computer-readable storage medium of claim 8, wherein the primary appliance, the backup appliance and one or secondary appliances comprise network security gateway devices coupled as an HA cluster.

14. The non-transitory computer-readable storage medium of claim 8, wherein transmitting a backup heartbeat packet from the backup appliance to regular heartbeat interface of the primary appliance in response to a determination that the primary appliance is not operating properly further comprises also transmitting the backup heartbeat packet to regular heartbeat interfaces of one or more secondary appliances of an HA cluster.

15. A system comprising:

a memory system having a plurality of interconnected memory devices;

one or more hardware processors coupled with the memory system, the one or more hardware processors configurable to:

monitor heartbeat packets from the primary appliance received via a regular heartbeat interface of the backup appliance with the backup appliance to determine whether the connection with the primary appliance via the regular heartbeat interface is stable;

enable a backup heartbeat interface on the backup appliance in response to a determination that the primary appliance is not operating properly resulting from analyzing at least a status of the heartbeat packets from the primary appliance;

transmit a backup heartbeat packet from the backup appliance to at least the regular heartbeat interface of the primary appliance in response to a determination that the primary appliance is not operating properly;

provide services with the backup appliance to replace services previously provided by the primary appliance; and continue transmission of backup heartbeat packets from the backup appliance while providing services with the backup appliance.

16. The system of claim 15 wherein the one or more hardware processors are further configurable to:

detect a return of a regular heartbeat signal from the primary appliance with the backup appliance; and transmit a backup heartbeat packet with an indication to discontinue use of the backup heartbeat packets.

17. The system of claim 16, wherein transmitting a backup heartbeat packet with an indication to discontinue use of the backup heartbeat packets causes appliances of the HA cluster to disable local backup heartbeat interfaces.

18. The system of claim 16 wherein the one or more processors are further configurable to provide the services with the primary appliance after use of the backup heartbeat packets has been discontinued.

19. The system of claim 15, wherein the primary appliance and the backup appliance comprise network security gateway devices coupled as an HA pair.

20. The system of claim 15, wherein the primary appliance, the backup appliance and one or secondary appliances comprise network security gateway devices coupled as an HA cluster.

* * * * *